Figure 1:
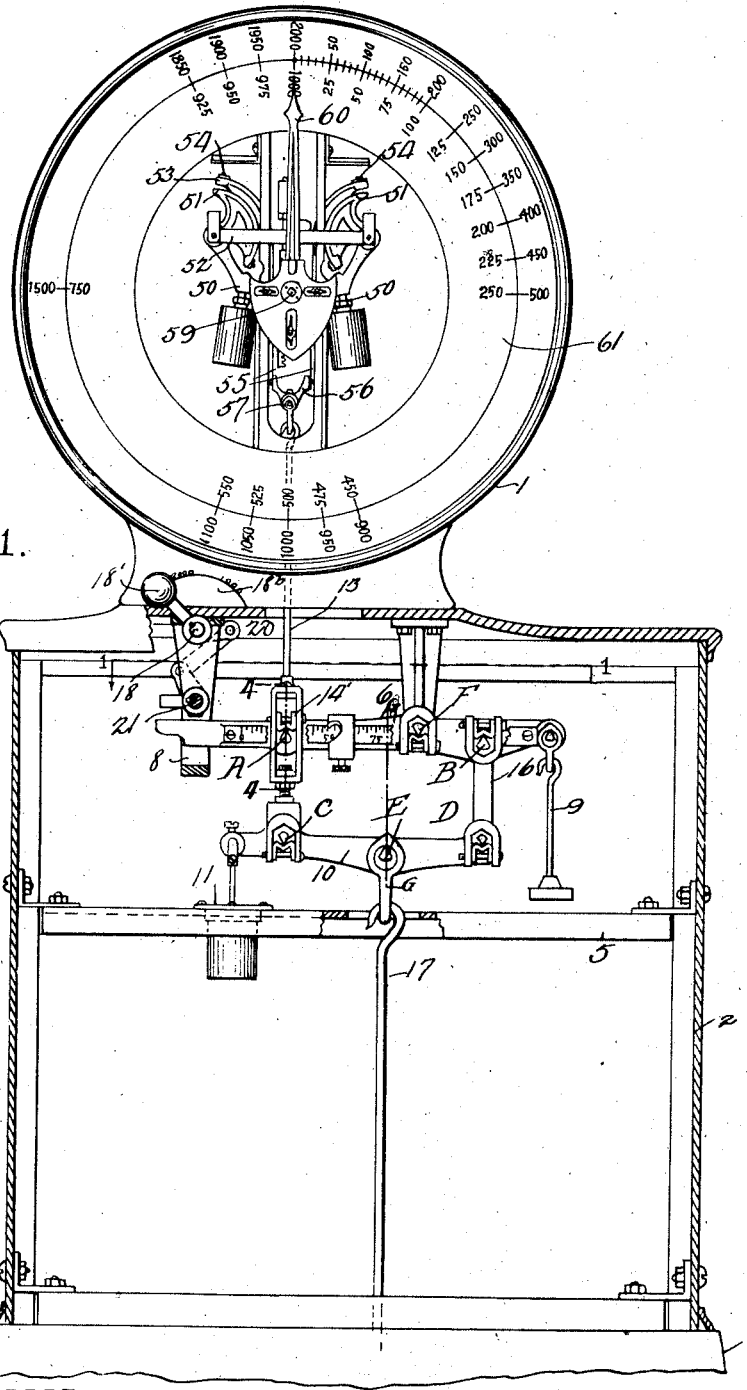

H. O. HEM.
WEIGHING SCALE.
APPLICATION FILED APR. 2, 1917.

1,369,102.

Patented Feb. 22, 1921.
4 SHEETS—SHEET 1.

WITNESSES.

INVENTOR.
Halvor O. Hem.
by George R. Frye
Attorney

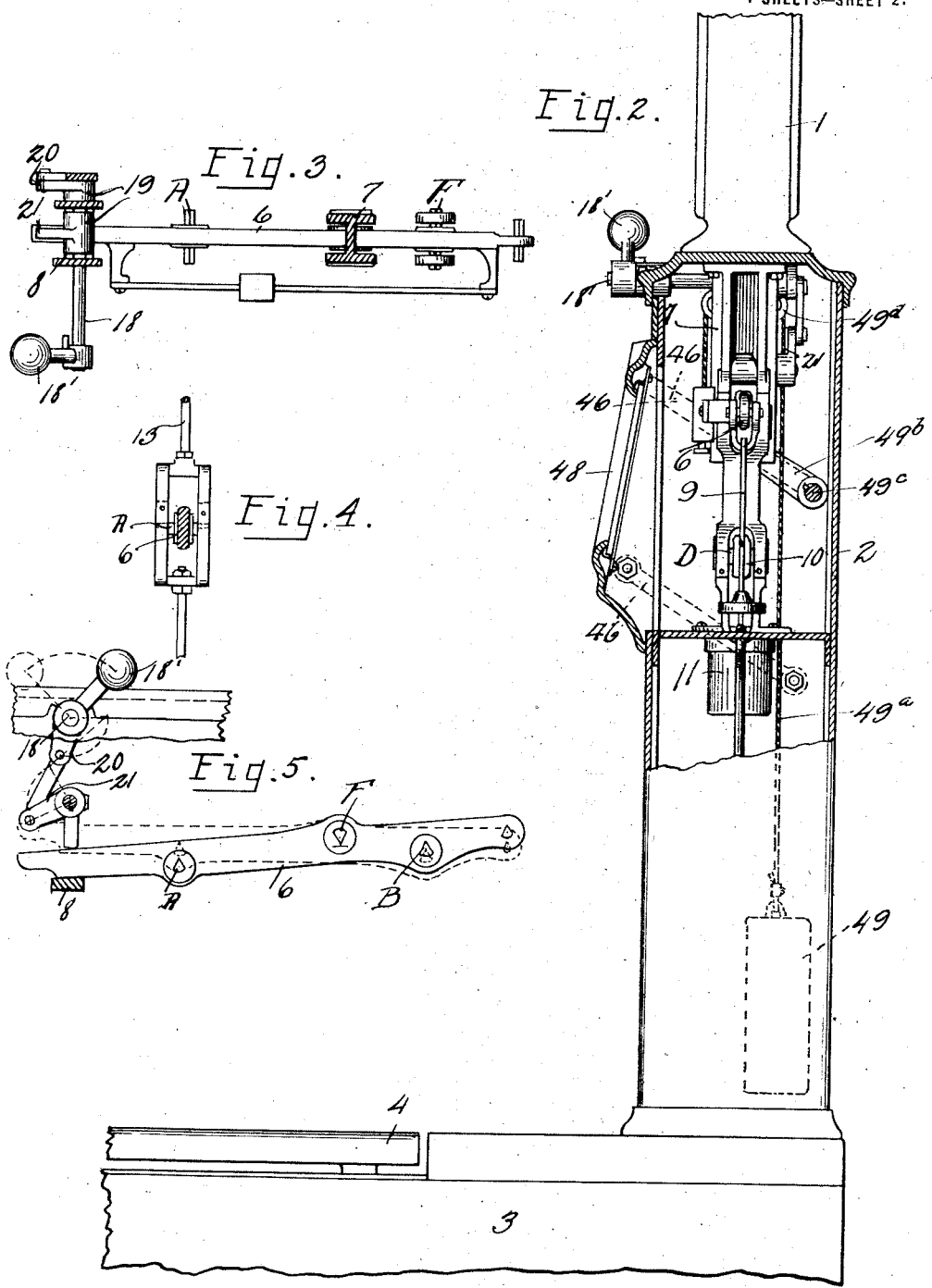

H. O. HEM.
WEIGHING SCALE.
APPLICATION FILED APR. 2, 1917.
1,369,102.
Patented Feb. 22, 1921
4 SHEETS—SHEET 3.
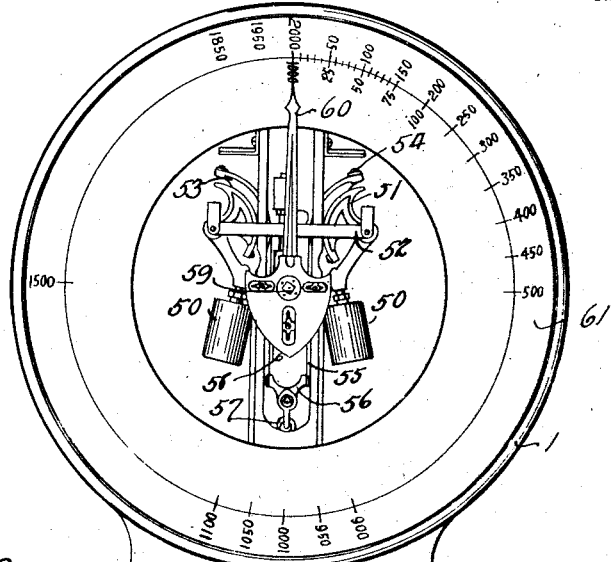
Fig. 6.
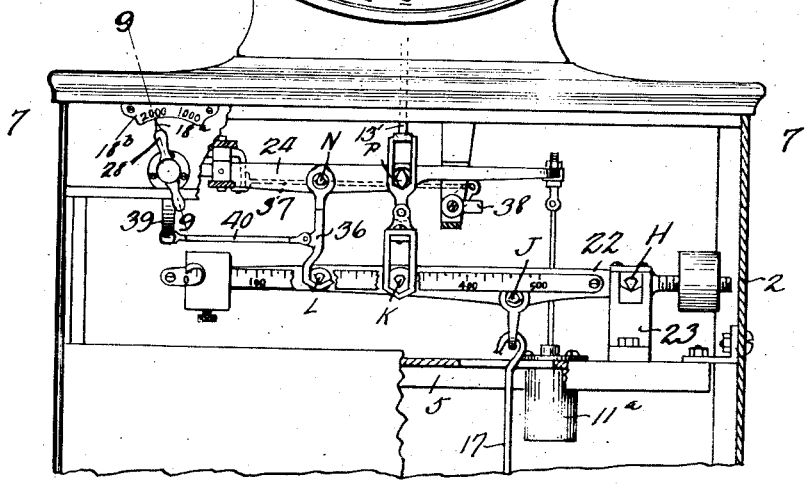
Fig. 7.
Fig. 8.
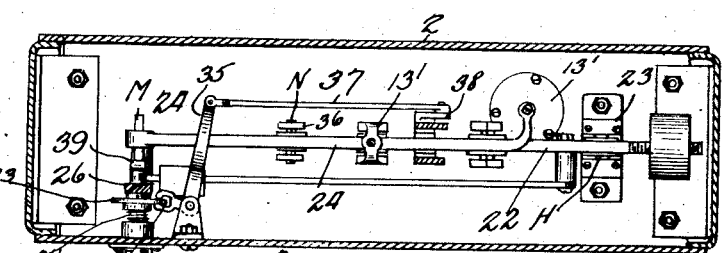
Fig. 9.
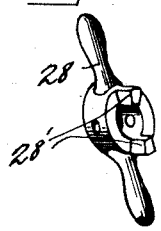
INVENTOR.
Halvor O. Hem.
by George R. Frye
Attorney

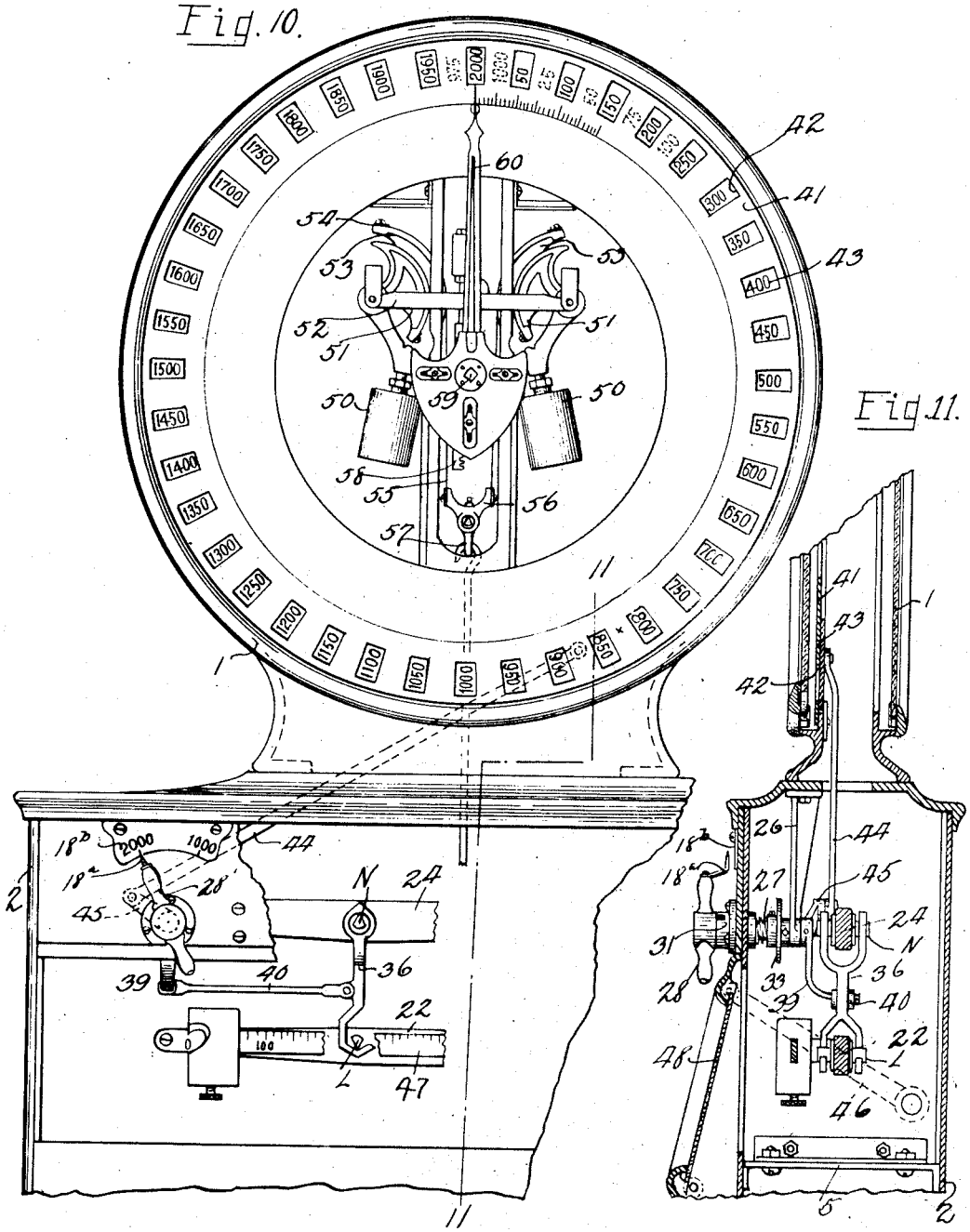

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,369,102.  Specification of Letters Patent.  Patented Feb. 22, 1921.

Application filed April 2, 1917. Serial No. 159,169.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales and more particularly to scales adapted to weigh comparatively heavy loads. In scales of this character it is often desirable to weigh commodities of greater weight than the capacity of the chart or dial of the scale, and to provide for the weighing of such commodities it is customary to incorporate auxiliary beams and pendent weights upon which may be moved or placed poises adapted to counterbalance the additional weight. When such is the case the total weight is not indicated in any one place, a portion of it being indicated on the chart and the remainder must be computed by the scale user by adding to the reading of the chart the effective weight of the pendent poises or the weight indicated upon the increased capacity beam by the movable poise.

It is the primary object of this invention to improve scales of this type by providing means whereby the total weight of commodities weighed on the scale may be shown upon the chart, while retaining the sensitiveness and width between graduations on the chart that is requisite in a high grade weighing machine. In carrying out my invention I provide a scale having a plurality of dial capacities, the lower of which is used until it is desired to weigh a commodity of greater weight than this capacity, whereupon the higher dial capacity may be readily brought into operation.

A further object of my invention is to provide a weighing machine whereby conveniently positioned manually-operated means are provided for altering the lever connections intermediate the scale platform and the load-offsetting mechanism to change the weighing capacity of the scale whenever desired.

Other objects and advantages will appear from the following description and the accompanying drawings, wherein preferred embodiments of my invention are illustrated, and wherein similar reference numerals designate similar parts throughout the several views.

In the drawings:—

Figure 1 is a front elevation of the upper mechanism of my improved scale, parts being broken away to show the interior mechanism thereof; Fig. 2 is a fragmental side elevation with parts in section; Fig. 3 is a horizontal sectional view taken on the line 1—1 of Fig. 1 looking in the direction of the arrows; Fig. 4 is a detail section on the line 4—4 of Fig. 1; Fig. 5 is a diagrammatic view illustrating the various positions assumed by the upper lever and the lever actuating mechanism; Fig. 6 is a view similar to Fig. 1 of another embodiment of my invention; Fig. 7 is a horizontal sectional view taken substantially on the line 7—7 of Fig. 6; Fig. 8 is a detail perspective view of the operating handle used in this embodiment; Fig. 9 is a detail sectional view taken substantially on the line 9—9 of Fig. 6; Fig. 10 is a fragmental front elevation of another form of scale embodying my invention; and Fig. 11 is a sectional view taken substantially on the line 11—11 of Fig. 10.

I will first describe the form of the invention illustrated in Figs. 1-5 inclusive, it being understood that the other embodiments are identical therewith except in respect to details to be hereinafter pointed out. As usual in scales of this character, the casing 2 of my scale is secured upon the base 3 (see Fig. 2) adjacent one end thereof, and supports at its upper extremity a housing 1 adapted to contain the pendulum counterbalance mechanism. The casing 2 is preferably provided with an intermediate bracing element or shelf 5. The upper lever 6 is fulcrumed, as at F, in bearings 7 within the casing 2 and one end thereof extends within the U-shaped bracket 8 for the purpose hereinafter set forth. The lever 6 is further provided with knife-edge pivots A and B respectively, on opposite sides of the fulcrum, the pivot A being arranged to engage intermediate bearings in the steelyard rod 13 when the scale is operating at its greater capacity. Attached to the end of the lever 6 adjacent the pivot B is a pendent counterweight 9 provided with a pan to receive removable counterpoise weights sufficient to float the platform and platform lever mechanisms and to maintain the same initial pull upon the pendulum counterbalance mechanism when the scale is operating at either its lesser or greater capacity. A lower lever 10 has one arm suspended, the pivots D thereof resting in the link 16 carried by the pivot B of the upper lever, the other arm thereof carrying pivots C engaging bearings in the lower extremity of the steelyard rod 13. Centrally of the pivots C and D the lever 10 is connected with the upper end of the lower steelyard 17, the lower end of which is connected with the platform supporting levers of the scale. A dash pot 11 operatively connected to the lever 10 serves to damp the vibratory movements of the levers and protect the more sensitive portions of the load-offsetting mechanism against shocks and jars. The platform 4 is supported upon the usual or any preferred type of platform lever mechanism, there being many suitable platform lever mechanisms now on the market capable of peforming the desired function, and it is to be understood that the present invention is not dependent for its operation upon any particular form thereof.

It its also to be understood that any suitable counterbalance mechanism may be employed in the construction of the scale—i. e., the load-offsetting mechanism may be of any desired type, spring, pendulum, pick-up weights, etc. The pendulum counterbalance mechanism herein illustrated is one that has been found to successfully demonstrate the capabilities of this invention, and shows a double pendulum scale of a well-known type adapted to be suitably connected with the levers 6 and 10 through the medium of the steelyard rod 13 and so arranged and positioned that upon the placing of a load upon the scale platform the pendulums will be swung upwardly into a position counterbalancing the weight of the load on the platform, the pendulums falling again to their normal or zero position when the load is removed from the scale platform. As herein shown, the pendulum counterbalance mechanism comprises a pair of oppositely-disposed pendulums 50, each of which comprises supporting segments 51 secured on transverse shafts, and the two shafts are connected by cross-bars 52, the segments 51 being suspended from the lower ends of flexible supporting ribbons secured at their upper ends upon the framework of the scale. Intermediate the supporting segments of each pendulum is a somewhat larger segment 53, which is also fixed to the transverse shaft, said segment extending at its periphery between the pillars of the framework supporting the segments 51, and is connected at its upper end, as at 54, to a flexible metallic ribbon 55 which extends over the arcuate face of the segment and is attached at its lower end to an equalizer bar 56. The construction of the two pendulums is substantially identical, and the ribbons 55, as shown in Figs. 1, 6 and 10, are connected to opposite sides of the equalizer bar 56, which is centrally connected, as by the link 57, with the upper end of the steelyard rod 13, which as before described is connected with the levers 6 and 10.

In the operation of the scale, when a load is placed on the scale platform, a downward pull is exerted on the equalizer bar 56, which is transmitted through the ribbons 55 to the larger segments 53, causing the swinging of the pendulums so that the pendulum weights are raised to a counterbalanced position. During the swinging movement of the pendulums to offset the weight of the load, the cross-bars 52 are moved vertically upward, and through the medium of this vertical movement of the cross-bars the weight indication on the dial is effected, the crossbars 52 carrying a vertically-disposed rack 58 meshing with a pinion (not shown) fixed upon the indicator shaft 59 carrying the index hand 60. The indicator shaft 59 is mounted concentrically of the dial 61 having the desired weight graduations suitably inscribed thereon, as, for example, in the manner illustrated in Figs. 1 and 6, with which graduations the index hand 60 coöperates in indicating the weight of the load being weighed. It will be noted that the dials shown in Figs. 1 and 6 have two sets of weight numerals coöperating with a single set of weight graduations, the numerals being marked on opposite sides of the reading line. This provides means whereby the scale may be utilized at either its lower or greater capacity, but it is to be understood that other means of marking the chart or dial may be provided as desired.

In operating at the lower capacity the lower lever 10 only is employed between the lower steelyard rod 17 and the upper steelyard 13 in transmitting loads to the pendulum counterbalance mechanism, the upper lever 6 being locked in a stationary position out of reach of the bearings 14' of the steelyard rod 13, which co-act with the pivots A of the upper lever when the scale is operating at its higher capacity. The locking means comprises a transverse shaft 18 extending outside the front of the casing 2 and provided with an operating handle 18', which is also utilized to indicate the weight at which the scale is operating, a pointer 18ª extending therefrom and coöperating with the indicating plate 18ᵇ. Mounted upon the shaft 18 is a collar 19 carrying an arm 20 connected by a pivotally connected link with the bell-crank locking member 21 journaled in the U-shaped bracket 8 in position to engage one extremity of the upper lever 6, as clearly shown in Figs. 1 and 5. With the upper lever 6 thus locked in stationary position the pivots A are spaced from the bearings 14 of the steelyard rod 13 and the only connection with the steelyard rod is through the pivot C of the lower lever 10. Therefore, when a load is placed on the scale platform the pull is transmitted through the lower steelyard 17 to the lower lever 10 and this lever operates with the pivots D as a fulcrum to move the upper steelyard 13 to actuate the pendulum counterbalance mechanism, as hereinbefore described. In the illustrated embodiment, the pivot E connected with the lower steelyard 17 is midway between the fulcrum pivots D and the pivot C of the lever 10 connecting with the upper steelyard 13, whereby it will be evident that the multiplication of the lever is 2:1. When, however, the locking mechanism is swung to release the upper lever 6—i. e., the position shown in Fig. 1—the pivots A of the upper lever will contact with the bearings 14 of the steelyard 13, and when a load is placed upon the scale platform, the pull is transmitted through the lower steelyard 17 to the central pivot E of the lower lever 10 and rocks both this lower lever and the upper lever 6, the line of pull of the upper lever being substantially in line with the line $g$—$g$, which crosses the upper lever at a point substantially one-fourth the distance between the fulcrum pivots F and the pivots A connecting with the steelyard. Thus, the upper lever 6 is swung downwardly with the leverage multiplication of substantially 4:1 and serves to move the steelyard rod only half the distance that it was moved when the scale was acting at the lower weight capacity. In other words, when both the lower and upper levers are free to oscillate, the pull transmitted through the lower steelyard 17 to the pivots E will be transmitted through both the lower and upper levers, the leverage obtained thereby being substantially 4:1, or one-half that which would be obtained were the lower lever 6 acting alone.

In the embodiment illustrated in Figs. 6–9, I have provided a main lever 22 fulcrumed adjacent one extremity, as at H, upon bearings 23 mounted upon the shelf 5 and formed with a plurality of spaced pivots designated by the letters J, K and L, the first of these pivots, J, being pointed upwardly and connected with the platform levers by the lower steelyard rod 17. The other pivots, K and L, are pointed downwardly and coöperate with the upper steelyard rod 13' and an arm 36 of the locking mechanism to be hereinafter described, the pivot K being spaced from the pivot H a distance substantially twice that of the distance between the pivots H and J. An auxiliary lever 24 is fulcrumed upon pivots M adjacent one extremity thereof (see Fig. 7) and carries spaced pivots N and P respectively, the pivot P resting upon suitable bearings in the upper steelyard rod 13', and the pivot N supporting the upper extremity of the arm 36 of the locking mechanism. A dash pot 11ᵃ is suitably connected with the free extremity of the lever 24. The locking mechanism employed with this embodiment comprises a transverse shaft 25 mounted in the depending bracket 26 and surrounded by an elongated sleeve 27 adapted to slide longitudinally on the shaft 25 but connected therewith for rotative movement suitable connecting means, as the slot 29 in the sleeve and the pin 30 extending from the shaft, being provided. Fixed at the forward extremity of the sleeve 27 is an operating handle 28 provided with teeth or ratchets 28' adapted to fit in the ratchet disk 31 fixed on the front of the scale housing. A spring 32 is suitably arranged between the plate 31 and a collar 33 fixed on the sleeve 27. The collar 33 extends between the jaws 34 (see Fig. 7) on one arm of the bell-crank lever 35, the other arm of the bell-crank being connected through the link 37 with the locking lever 38 adapted to be swung upwardly to contact with the free end of the lever 24 to lift the same and the free end of the main lever 22 so that the pivot L of the main lever may be moved upwardly sufficiently to allow the locking arm 36 to be swung under it. When it is desired to change the leverage mechanism so that the scale may operate at the higher capacity, the operating handle 28 is grasped and moved outwardly to free the teeth 28' from the ratchet disk 31, this outward movement serving to swing the bell-crank lever 35 as above described. The operating handle 28 is then rotated and turns the shaft 25 and the arm 39 fixed thereto to swing the locking arm 36 under the pivot L of the main lever, the link 40 being interposed between the locking arm 36 and the arm 39. This rotative movement having been completed, the handle is released and the spring 32 returns the same to its original position, in so doing rocking the bell-crank lever 35 to remove the locking member 38 from engagement with the subordinate lever 24, the position assumed being then substantially that shown in Fig. 6 of the drawings. At this higher capacity when a load is placed upon the platform of a scale the pull is transmitted through the lower steelyard 17 to the pivot J and acts to swing the free end of the lower lever 22 downwardly, thereby transmitting the movement through the pivot L and the locking arm 36 to the pivot N of the auxiliary lever 24, swinging the free end of the auxiliary lever downwardly and so moving the pivot P thereof downwardly to actuate the upper steeelyard 13', thereby transmitting the pull to the pendulum counterbalance mechanism. This movement transmitted at the pivot P is substantially one-fourth of that transmitted to the pivot J of the main lever, owing to the fact that the above-described system of leverage has a multiplication of approximately 4:1.

When, however, it is desired to operate at the lower weight capacity, the handle 28 is grasped and pulled outwardly as above described, thereby lifting the auxiliary lever 24 and the free end of the main lever 22 a sufficient distance to free the pivot L of the main lever from the locking arm 36. The handle 28 is then rotated to swing the locking arm 36 from under the pivot L. The handle is then released and the spring 32 serves to release the locking member 38 from the auxiliary lever 24. When the pivot L is thus free from the locking arm 36 and a load is placed on the scale platform, the pull will be transmitted through the lower steelyard 17 to the pivot J of the main lever, as hereinbefore described, but the auxiliary lever 24 will have no part in transmitting the pull to the pendulum counterbalance mechanism, the movement at the pivot J being transmitted directly through the lever 22 to the pivot K thereof engaging the steelyard rod 13', thereby actuating the pendulum counterbalance mechanism to offset the weight of the load on the scale platform. Since the pivot J is midway between the fulcrum pivot H and the pivot K connecting with the steelyard 13', the multiplication is substantially 2:1, or twice that transmitted when the scale is operating at the higher weight capacity.

In the embodiment illustrated in Figs. 10 and 11, I have illustrated another embodiment of chart mechanism whereby only one set of weight numerals appears upon the chart at any time. An outside or cover plate 41 is fixed adjacent the forward extremity of the scale and carries the reading line and weight graduations thereon, together with a series of circumferentially spaced apertures 42 alining with certain of the weight graduations, as clearly shown in Fig. 10. Rotatably mounted behind the cover plate 41 is a ring 43 bearing two or more sets of weight numerals thereon, so spaced from each other that all the numerals of one set are apparent through the set of apertures in the cover plate at one time, while the remaining sets of numerals are concealed behind the spaces between the apertures 42. This ring 43 may be rotated to disclose the other or others of the sets of weight numerals at the same time that the change is made in changing the leverage mechanism of the scale to allow the scale to operate at a different capacity. Thus, as shown in Figs. 10 and 11, a link 44 is pivotally connected at its upper extremity with the ring 43 and at its lower extremity with an arm 45 fixed upon the transverse shaft 27 of the leverage changing mechanism, and serves to rotate the ring 43 a sufficient distance to bring another or the other of the sets of weight numerals into alinement with the apertures in the cover plate 41 simultaneously with the change of the leverage mechanism.

Whenever desired, a tare or increased capacity beam 47 may be secured upon the main lever 22 or the upper lever 6, as herein shown, and coöperate with a slidable poise in the usual manner. Ready access to the slidable poises of the tare or capacity beams may be had through an opening in the front of the casing 2, this opening being normally covered by a door 48 connected with the casing 2 by means of parallel links 46 pivoted to the door and casing respectively. The parallel links 46 are preferably arranged on opposite sides of the casing and are so connected with the upper and lower portions of the door and the casing that the door will lie closely against the forward portion of the casing in both of its extreme positions, the extreme closed position being shown in Fig. 2. To facilitate the opening and closing of the door 48 a counterbalance weight 49 is connected by means of a flexible cable $49^a$ with a crank $49^b$ carried by the cross shaft $49^c$ connecting the uppermost of the parallel arms 46, the flexible cable passing over suitable pulleys $49^d$ of the casing.

While it will be apparent that the illustrated embodiments of my invention herein shown are well calculated to adequately fulfil the objects and advantages primarily stated, it is to be understood that my invention is susceptible of variation, modification and change without departing from the spirit and scope of the invention as set forth in the subjoined claims.

Having described my invention, I claim:

1. In a weighing scale, the combination of a platform, load-offsetting mechanism, connections between the platform and load-offsetting mechanism including a lever, said connections also including an auxiliary lever connected with said lever and adapted when in motion to vary the weighing capacity of the scale, and means for holding the auxiliary lever against motion when desired.

2. In a weighing scale, the combination of a platform, load-offsetting mechanism, connections between the platform and load-offsetting mechanism including a lever, said connections also including an auxiliary lever connected with said lever and adapted when in motion to vary the weighing capacity of the scale, and manually-operated means for holding the auxiliary lever against motion when desired.

3. In a weighing scale, the combination of a platform, load-offsetting mechanism, connections between the platform and load-offsetting mechanism including alternate sets of leverage mechanisms adapted to transmit different pulls upon the steelyard rod of the load-offsetting mechanism, one of said mechanisms including a single lever connected with the steelyard rod, and another of said mechanisms further including an auxiliary lever arranged to be connected with said first-mentioned lever to swing therewith when desired, and means for selecting one or the other of said leverage mechanisms.

4. In a weighing scale, the combination of a platform, load-offsetting mechanism, connections between the platform and load-offsetting mechanism including alternate sets of leverage mechanisms adapted to transmit different pulls upon the steelyard rod of the load-offsetting mechanism, one of said mechanisms including a single lever connected with the steelyard rod, and another of said mechanisms further including an auxiliary lever arranged to be connected with said first-mentioned lever to swing therewith when desired, and means for locking one of said leverage mechanisms while permitting the other leverage mechanism to operate.

5. In a weighing scale, the combination of a platform, load-offsetting mechanism, connections between the platform and steelyard rod of the load-offsetting mechanism including alternate sets of leverage mechanisms adapted to transmit different pulls upon the load-offsetting mechanism, one of said mechanisms including a single lever connected with the steelyard rod, and another of said mechanisms further including an auxiliary lever arranged to be connected with said first-mentioned lever to swing therewith when desired, and manually-operated means for selecting one or the other of said leverage mechanisms.

6. In a weighing scale, the combination of a platform, load-offsetting mechanism, connections between the platform and steelyard rod of the load-offsetting mechanism including alternate sets of leverage mechanisms adapted to transmit different pulls upon the load-offsetting mechanism, one of said mechanisms including a single lever connected with the steelyard rod, and another of said mechanisms further including an auxiliary lever arranged to be connected with said first-mentioned lever to swing therewith when desired, and manually-operated means for holding one of the leverage mechanisms out of engagement and permitting the other to complete the connecting means.

7. In a weighing scale, a platform, load-offsetting mechanism, connections between the platform and load-offsetting mechanism including a plurality of leverage mechanisms arranged to be alternately employed to transmit the pull exerted upon the steelyard rod of the load-offsetting mechanism, an index hand actuated from the load-offsetting mechanism, a chart co-acting with the index hand and having a plurality of weight capacities marked thereon, one of said mechanisms including a single lever connected with the steelyard rod, and another of said mechanisms further including an auxiliary lever arranged to be connected with said first-mentioned lever to swing therewith when desired, and means for selecting one or the other of said leverage mechanisms for causing the scale to weigh to any of the capacities of the chart.

8. In a weighing scale, the combination of a platform, load-offsetting mechanism, and connections between the platform and load-offsetting mechanism including a steelyard, a lever connected intermediate its ends with the steelyard, a second lever fulcrumed intermediate its ends and having one arm connected with one arm of the first-mentioned lever, a second steelyard rod connected at its upper end to the load-offsetting mechanism and arranged to be connected adjacent its lower extremity with either of said levers, and means for moving one of said levers out of engagement with said second steelyard rod when desired.

9. In a weighing scale, the combination of a platform, load-offsetting mechanism, and connections between the platform and load-offsetting mechanism including a steelyard, a lever connected intermediate its ends with the steelyard, a second lever fulcrumed intermediate its ends and having one arm connected with one arm of the first-mentioned lever, a second steelyard rod connected at its upper end to the load-offsetting mechanism and arranged to be connected adjacent its lower extremity with either of said levers, a tare beam carried by one of said levers, and means for moving one of said levers out of engagement with said second steelyard rod when desired.

10. In a weighing scale, the combination of a platform, load-offsetting mechanism, and connections between the platform and load-offsetting mechanism including a steelyard, a lever connected intermediate its ends with the steelyard, a second lever fulcrumed intermediate its ends and having one arm connected with one arm of the first-mentioned lever, a second steelyard rod connected at its upper end to the load-offsetting mechanism and arranged to be connected adjacent its lower extremity with either of said levers, means connected with one of said levers for floating the platform, and means for moving one of said levers out of engagement with said second steelyard rod when desired.

11. In a weighing scale, a platform, load-offsetting mechanism, an index hand actuated from the load-offsetting mechanism, a chart having a plurality of indicated dial capacities, connections between the platform and load-offsetting mechanism including a plurality of leverage mechanisms adapted to be alternately employed in transmitting the pull from the platform, and means for simultaneously changing the indicated capacity of the chart and the leverage mechanism for transmitting the pull.

12. In a weighing scale, a platform, load-offsetting mechanism, an index hand actuated from the load-offsetting mechanism, a chart having a plurality of indicated dial capacities, connections between the platform and load-offsetting mechanism including a plurality of leverage mechanisms adapted to be alternately employed in transmitting the pull from the platform, and manually-operated means for selecting the desired indicated capacity of the chart and the leverage mechanism for transmitting the pull.

13. In a weighing scale, the combination with a commodity receiver and load-offsetting mechanism, of connection therebetween including a series of motion multiplying levers, and means for selectively transmitting motion from said support to said load-offsetting mechanism, through all levers of said series, and means for locking a part of said series against movement while permitting transmission of motion through the remaining part of said series.

14. In a weighing scale, the combination with a commodity receiver and load-offsetting mechanism, of connection therebetween including a series of motion multiplying levers, and means for effectively restraining a part of said series of levers against movement and establishing a motion multiplying connection through the remaining part of the series of levers to the load-offsetting mechanism.

15. In a weighing scale, the combination with a commodity receiver and load-offsetting mechanism, of connection therebetween including a series of motion multiplying levers, and means for effectively restraining one of the levers of said series against movement and establishing a motion multiplying connection through the remaining part of the series of levers to the load-offsetting mechanism.

HALVOR O. HEM.

Witnesses:
  C. F. MILLER, Jr.,
  R. HECKLER.